Nov. 27, 1951     H. G. WILLIS     2,576,164
COMBINATION DEPOSIT AND CASH SLIP
Filed Sept. 3, 1948     2 SHEETS—SHEET 1
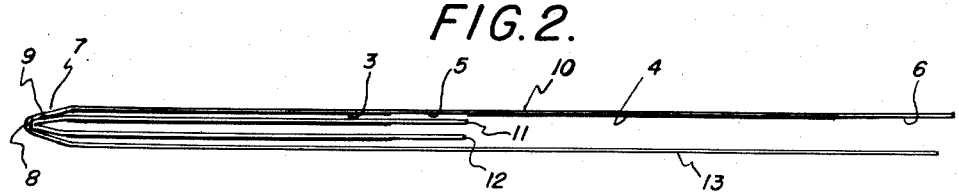
INVENTOR
HENRY G. WILLIS
BY
HIS ATTORNEY Nov. 27, 1951     H. G. WILLIS     2,576,164
COMBINATION DEPOSIT AND CASH SLIP
Filed Sept. 3, 1948     2 SHEETS—SHEET 2

INVENTOR
HENRY G. WILLIS
BY Arthur G. Connolly
HIS ATTORNEY

Patented Nov. 27, 1951

2,576,164

UNITED STATES PATENT OFFICE 2,576,164

COMBINATION DEPOSIT AND CASH SLIP

Henry George Willis, Wilmington, Del.

Application September 3, 1948, Serial No. 47,703

3 Claims. (Cl. 282—23)

This invention pertains to a new combination deposit and cash slip for use by banks which simplifies greatly the work of the receiving teller, while at the same time providing a constant and accurate check on the daily transactions.

As is well known, the "paper work" involved in depositing cash and checks with a bank is both complex and time-consuming. Customarily, the depositor fills out a deposit slip which has the name of the bank at the top, followed by a space for the depositor's name, the date of deposit, a space for the amount of bills deposited, another space for the amount of coins deposited and following this a series of spaces for the identification and amount of individual checks deposited. At the bottom of the slip is a space for the total of the deposit. If the depositor wishes a duplicate deposit slip a second one corresponding to the foregoing is prepared by him, otherwise he uses a pass book. The depositor then presents to the teller two deposit slips filled out as above or one deposit slip and a pass book along with the bills, coins and checks to be deposited.

The teller upon receiving the foregoing, must enter in the pass book the amount deposited or stamp upon the duplicate deposit slip a receipt for the stated amount. In addition, he must prepare at least two so-called "cash slips" whereon is noted the amount of bills and coins included in the deposit. One of these slips is retained by the teller and the other slip is for the use of the proof department to keep an account on the cash transactions of each teller. In addition to the amount of bills and coins these cash slips must contain additional identifying information such as the teller's initials, the date and the depositor's name. Needless to say, the numerous steps referred to previously are most time-consuming and likewise involve the constant possibility of error. Thus, it is not at all unusual during a busy period to find a long line of customers waiting before the window of each teller, while he laboriously goes through the required steps to properly record each deposit.

In an effort to overcome the disadvantages referred to, complicated and costly mechanical devices have been designed and appreciably speed up the work of the teller. These devices, however, are not only very expensive but they, too, require that considerable attention be paid to each deposit since the proper keys, etc. must be set and various slips must be inserted in the required portions of the machine in order to keep an accurate record of the transactions.

It is an object of my invention to substantially reduce and speed up the work of bank tellers in a manner which does not necessitate the purchase of expensive and complicated machinery. A further object is to devise a simple combination deposit and cash slip which is practically foolproof and which supplies the teller, the bank and the depositor with all the required information. Additional objects will become apparent from the following description and claims.

These and other objects are achieved by my invention, which is illustrated in the accompanying drawings, wherein:

Fig. 1 is a perspective view of my combination deposit and cash slip.

Fig. 2 is an edge view of my combination deposit and cash slip.

Figs. 3, 4, 5 and 6 are face views, respectively, of the first, second, third and fourth sheets of my invention. (Fig. 3 shows the first sheet turned up at one corner to disclose a portion of the fourth sheet.)

In the figures the same parts are similarly numbered.

Referring to Figs. 1 and 2, it can be seen that my top slip 10, on its face, is quite similar to the customary deposit slips which are used by banks generally. The second (Fig. 4) and third (Fig. 5) sheets are cash slips, 11 and 12 respectively; and the fourth sheet 13 (Fig. 6) is a duplicate deposit slip. These four sheets are made up of two strips of paper folded one within the other at 7. Their folds are perforated, as indicated by 8, for ready separation into the four sheets. The first and second sheets are joined by spot pasting 9, since, as will be mentioned hereinafter, they are routed together to the same department.

On the backs of sheets 10, 11 and 12 are similar carbonized areas 3, and uncarbonized areas 5. In addition, sheet 10 has a second carbonized area 4 and an uncarbonized area 6.

Referring to Fig. 3, slightly above the center of the slip 10 is a space which separates the cash deposit figures from the check deposit figures. On my slip this space is not used for recording purposes, since the back of this space 5 is left uncarbonized. In this space information of a general nature or a decorative motif may be included if desired. The deposit slip 10 is filled out by the depositor in the usual manner, with the name of the depositor, the date, the amount of bills deposited, the amount of coins deposited and the identification and amount of each check deposited, followed by the total deposit.

The carbonizing of portion 3 permits the identification of the depositor, the date and the cash transactions to be duplicated on each of the cash slips 11 and 12, as well as on the duplicate deposit slip 13. The carbonizing of portion 4 permits the identification of the individual checks, their amounts and the total deposit to be repeated on the duplicate deposit slip. Hence, in every respect this duplicate deposit slip is an exact counterpart of the original, which is retained by the bank.

Uncarbonized space 5 and the corresponding uncarbonized space on the back of the cash slips 11 and 12 provide a clean area whereby the cash slips may be handled without smudging the fingers or records of the tellers and bookkeepers. Uncarbonized space 6 also provides a clean space whereby the original deposit slip may be handled by the teller and the bookkeepers without smudging the fingers or records. This space 6 advisably extends slightly below the bottom of the duplicate deposit slip so that the teller may readily grasp it and separate the combination deposit and cash slip into the desired component parts.

After the depositor has filled out sheet 10 in the customary manner, he presents the combination deposit and cash slip to the teller, with whatever bills, coins and checks are to be deposited. Before separating the sheets, the teller stamps sheet 10 with the date and his identification, this stamp appearing on cash slips 11 and 12, and on duplicate deposit slip 13. The teller then grasps the bottom of sheet 10 and tears the strips along the perforated folds 8. Duplicate deposit slip 13 is given to the depositor as his itemized receipt. Cash slip 12 is retained by the teller as a record of the cash for which he is accountable to the bank. Original deposit slip 10, to which is still attached cash slip 11, by paste spots 9, is routed to the proof department where these slips are separated. The proof department retains cash slip 11 as a record of the cash chargeable to the teller, and routes the original deposit slip 10 to the bookkeeping department, where it is credited to the account of the depositor, photographed if desired, and filed with the bank's records.

As is evident from the foregoing, my combination deposit and cash slip provides an amazingly simple and accurate method of avoiding numerous time-consuming steps that heretofore have been required of bank tellers. The teller need only tear the slip along the perforated line at the top to produce all the records necessary for himself, the other departments of the bank and the depositor. All the information required with the exception of the teller's identification and the date is supplied by the depositor in making out the original deposit slip. Thus, the chance for error is eliminated.

As many apparently widely different embodiments of this invention may be made without departing from the spirit and scope hereof, it is to be understood that the invention is not limited to the specific embodiments hereof except as defined in the appended claims.

I claim:

1. A combination bank deposit and cash slip comprising two folded strips of paper nested together at their folds to form an assembly of four stacked sheets, the top sheet being a deposit slip having suitable appropriately designated spaces for the entry of the deposit information including the name of the depositor, the date, the amount of bills and coin, the listing of the checks and the total of the deposit amount, the back of the top sheet being carbonized to effect duplication of these entries on the lower sheets, the second and third sheets from the top being cash slips having carbonized backs and shorter than the top sheet for receiving and transferring carbonized copies only of the name of the depositor, date, and the amount of bills and coin, the bottom sheet being a duplicate deposit slip longer than the cash slips for receiving carbonized copies of all the deposit data, said strips having their folds perforated for ready detachment of the individual slips and being detachably united by pasting of the top sheet to the adjacent sheet near their folds to initially hold the strips together and to hold the top sheet to the adjacent sheet when the top sheet is torn from the bottom sheet.

2. The combination as defined by claim 1 in which the top sheet is longer than the bottom sheet to provide a convenient lifting tab, and the lower portion of the top sheet including the tab has its back surface uncarbonized to avoid smudging during handling.

3. A combination bank deposit form comprising two folded strips of paper nested together at their folds to form an assembly of four stacked sheets, the top sheet being a deposit slip having suitable appropriately designated spaces for the entry of the deposit information including the name of the depositor, the date, the amount of bills and coin, the listing of the checks and near the bottom of the sheet the total of the deposit amount, the back of the top sheet being carbonized to effect duplication of these entries on the lower sheets, the second and third sheets from the top being proof and teller slips having carbonized backs for receiving and transferring carbonized copies of at least some of the entries, one of these last-mentioned two sheets being shorter than the top sheet so that the short sheet does not receive copies of the total of the deposit amount, the bottom sheet being a duplicate deposit slip longer than the short slip for receiving carbonized copies of all the deposit data, said strips having their folds perforated for ready detachment of the individual slips and being detachably united by pasting of the top sheet to the adjacent sheet near their folds to initially hold the strips together and to hold the top sheet to the adjacent sheet when the top sheet is torn from the bottom sheet.

HENRY GEORGE WILLIS.

REFERENCES CITED

The following references are of record in the file of this patent:

UNITED STATES PATENTS

| Number | Name | Date |
|---|---|---|
| 1,279,189 | Weir | Sept. 17, 1918 |
| 1,804,806 | Phillips | May 12, 1931 |
| 2,327,215 | Potter | Aug. 17, 1943 |